3,205,074
METHOD OF TREATING FOOD PRODUCT
PREPARED IN FLUIDIZED BED
Herman Nack and Howard G. Schutz, Columbus, Ohio, assignors, by mesne assignments, to International Milling Company, Minneapolis, Minn., a corporation of Delaware
No Drawing. Filed May 17, 1962, Ser. No. 195,402
1 Claim. (Cl. 99—100)

This invention relates to a process for treating food by immersing it in a fluidized bed of solid, discrete particles. More particularly, this invention relates to an improvement in the process of cooking food in a fluidized bed as set forth in copending application Serial No. 817,091, now U.S. Patent 3,035,918.

A fluidized bed is, by definition, a mass of solid particles that exhibits the liquidlike characteristics of mobility, hydrostatic pressure, and an observable upper free surface or boundary zone across which a marked change in concentration of particles occurs. A fluidized bed system is created by passing a stream of gas or liquid upwardly through a mass of solid particles. As the velocity of the fluid increases, the pressure drop through the bed mass rises until it approaches the net effective weight of the solid per-unit area and the packing arrangement becomes more open so that the bed expands. If the velocity of the gas or liquid stream is increased slightly further, the particles are fully supported and the expanding bed becomes fluidized and exhibits the characteristics noted above. Upon further increase in velocity of the gas or liquid, the mass becomes turbulent and mixing of the mass of solids takes place.

In application Serial No. 817,091, there is described a process for cooking food wherein the food products to be cooked is immersed in a fluidizing bed of hot, solid, discrete particles. The process is described in particular with respect to the cooking of potato slices to prepare potato chips or "French fried" potatoes.

It sometimes happens that the potato product produced in accordance with the process of Serial No. 817,091 is dry and, consequently, hard. In other instances, the product looks and tastes dry and taste panel tests have shown that some people object to both.

It is therefore, an object of this invention to provide cooked potato products, such as potato chips or French fried potatoes, that are of dietary interest in that the oil or fat content is substantially reduced as compared with present products, but at the same time are pleasing to the taste and sight.

It is another object of this invention to enhance the appearance and taste of a food product produced by cooking in a fluidized bed of hot, solid, discrete particles.

It is a further object of this invention to moisten food products cooked in a fluidized bed of hot, solid, discrete particles and to render such food products easier to chew.

Other objects and advantages of the present invention will be apparent from the following detailed description thereof.

In general, this invention comprises a method of treating a food product that has been prepared by cooking in a fluidized bed of hot, solid, discrete particles, such method comprising the steps of adding an edible oil to such food product and reheating the food product just enough to diffuse the oil into the cooked food product.

Oil may be added to the food product in any usual manner. For example, the food product may be dipped in the oil, or the oil may be sprayed or dripped onto the food product. Spraying has proved to be the most practical procedure and, in general, is preferred.

Either saturated or unsaturated oil may be used for treating food products according to this invention. For example, corn oil (unsaturated) and hydrogenated cotton seed oil (saturated) have both proved suitable for use in the process.

The amount of oil added may vary from a mere trace to as much as 30 percent. In general, it is preferred to add an amount in the range of from about 15–20 percent. This means that the added oil constitutes 15–20 percent of the total final product (cooked food and oil).

In general, if less than about 10 percent oil is added to the food product, it is not necessary to reheat to diffuse the oil. However, reheating is required in the preferred range of about 15–20 percent oil. The reheating temperature is in the range of from about 125–250° F., with preferred temperature being about 200° F. Heating should be continued for from about 5 minutes to about 20 minutes, depending upon the temperature and also upon the food product being treated.

In those instances where more than about 10 percent oil is added, it is essential that the reheating step be employed. Otherwise, the added oil merely runs off the food product during storage. However, if the reheating step is used, the added oil is diffused into the food product and is retained therein during storage.

Food products prepared in a fluidized bed of hot, solid, discrete particles and treated in accordance with the present invention are characterized in general by improved appearance and taste. Their odor is changed and so, too, is their nutritional value. The following detailed examples will serve to illustrate the present process.

*Example 1*

Potato chips cooked in a fluidized bed of hot, sodium chloride particles were placed upon a conveyor belt driven by a variable speed motor and passed under a feed jar dispenser filled with corn oil. Air pressure to the nozzle of the feed device was set at 5 p.s.i.g. The rate of the conveyor belt was determined by placing a few chips on the belt and passing them under the dispenser at various speeds until the desired percentage oil addition was obtained. Once proper belt speed was determined, chips were placed in wire baskets on the belt and passed under the oil dispenser and sprayed with oil. In this manner 15 percent of corn oil was added to the chips. The oiled chips were then passed through an oven maintained at 200° F. The chips were in the oven for 5 minutes. Taste panel results showed a preference for the oil-enhanced chips as compared with the as-cooked chips.

*Example 2*

Potato chips cooked in a fluidized bed of hot, sodium chloride particles were treated in accordance with Example 1 except that 15 percent hydrogenated cotton seed oil was sprayed onto the chips. Again, taste panel tests showed a preference for the oil-enhanced chips.

The following examples illustrate the effectiveness of the reheating step to eliminate draining of the added oil from cooked food products.

*Exampel 3*

A batch of potato chips weighing 24.76 grams in the dry state was sprayed with corn oil until 6.99 grams of oil had been added. The oiled chips were not reheated. After 17 hours storage at room temperature it was found that 0.83 g., or 11.9 percent of the added oil, had drained off into the container. The oil content of the final product was 19.9 percent.

26.04 grams of dry chips were sprayed with corn oil under the same conditions until 6.93 grams of oil had been added. The oiled chips were reheated for 5 minutes at 200° F. After 16½ hours storage at room temperature it was found that none of the added oil had drained from the chips. The oil content of the final product was 21.0 percent.

Example 4

Corn oil was added to 25.18 grams of potato chips by dipping the chips in the oil at room temperature. 15.40 grams of oil were added by dipping for 30 seconds. No reheating step was used. After storage at room temperature for 21 hours it was found that 4.88 grams, or 31.7 percent of the added oil, had drained off the chips. The oil content of the final product was 29.4 percent.

Corn oil was added to 25.55 grams of potato chips by dipping the chips in the oil for 5 seconds at room temperature. 10.65 grams of oil were added in this manner. The oiled chips were reheated at 200° F. for 5 minutes. After storage for 18 hours at room temperature it was found that none of the added oil had drained off and the oil content of the final product remained at 29.4 percent.

Taste panel studies show a decided preference for potato chips to which 15–20 percent oil has been added following cooking in a fluidized bed of hot, solid discrete particles and where the added oil has been diffused into the chips by reheating so that it (the added oil) is retained in the chip.

Some advantage may be gained by heating the oil before adding it to the food product. Even so, however, the reheating of the oiled product is necessary if oil drainage is to be kept within reasonable limits. This is illustrated in the following example.

Example 5

A batch of potato chips weighing 26.68 grams in the dry state was dipped in corn oil at 200° F. for 5 seconds. 13.22 grams of oil was added in this manner. The dipped chips were not reheated after being removed from the oil. After storage for 24 hours at room temperature it was found that the chips had lost 1.88 grams (or 14.2 percent) of the added oil due to drainage in storage. The oil content of the final product was 29.8 percent.

A second batch of potato chips weighing 25.20 grams in the dry state was dipped in corn oil at 200° F. for 5 seconds. 8.90 grams of oil was added in this manner. The dipped chips were reheated at 200° F. for 5 minutes after being removed from the oil bath. After storage for 23 hours at room temperature, it was found that the chips had not lost any of the added oil. The oil content of the final product was 26.1 percent.

It will be obvious to those skilled in the art that this disclosure is illustrative and not limiting insofar as details are concerned. Various departures from the exact disclosure will be apparent. For example, safflower oil and peanut oil have been shown to be equally effective to the corn oil and hydrogenated cotton seed oil of the disclosure. Other similar changes within the scope of the invention are intended to be considered a part thereof.

A new and useful method for treating food cooked in a fluidized bed having been disclosed and illustrated, it is desired to further define the novel process in accordance with the follow claim.

What is claimed is:

A method of treating dry, cooked potato products that have been prepared by cooking in a fluidized bed of non-toxic, hot, solid, discrete particles, said method comprising the steps of spraying the surface of said dry, cooked potato product with an edible oil selected from the group consisting of corn oil, hydrogenated cottonseed oil, safflower oil, and peanut oil, and diffusing said oil into said product in an amount ranging from 15–20 percent by reheating the said product for from 5–20 minutes at a temperature of from 125–250° F.

References Cited by the Examiner

UNITED STATES PATENTS

| | | | |
|---|---|---|---|
| 2,446,889 | 8/48 | Sjostrom | 99—188 |
| 2,980,731 | 4/61 | Alheritiere et al. | |
| 3,035,918 | 5/62 | Sorgenti et al. | 99—1 |

FOREIGN PATENTS 632,417   12/61   Canada.

A. LOUIS MONACELL, *Primary Examiner.*

HYMAN LORD, *Examiner.*